US007866301B2

(12) United States Patent
Venkataraghavan et al.

(10) Patent No.: US 7,866,301 B2
(45) Date of Patent: Jan. 11, 2011

(54) SELF-GUIDED ARMATURE IN SINGLE POLE SOLENOID ACTUATOR ASSEMBLY AND FUEL INJECTOR USING SAME

(75) Inventors: Jayaraman K. Venkataraghavan, Dunlap, IL (US); Stephen R. Lewis, Chillicothe, IL (US); Nadeem N. Bunni, Cranberry Township, PA (US); Shriprasad Lakhapati, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 62 days.

(21) Appl. No.: 12/321,809

(22) Filed: Jan. 26, 2009

(65) Prior Publication Data

US 2010/0186719 A1 Jul. 29, 2010

(51) Int. Cl.
*F02M 51/06* (2006.01)
*H01F 7/16* (2006.01)
*F16K 31/06* (2006.01)

(52) U.S. Cl. ............... 123/472; 239/585.1; 251/129.09; 335/255

(58) Field of Classification Search ................. 123/467, 123/472, 490, 498, 499; 239/585.1–585.3, 239/132, 132.1, 132.3; 335/255, 262, 219, 335/236, 237; 215/129.15, 129.16, 129.21, 215/129.09
See application file for complete search history.

(56) References Cited

U.S. PATENT DOCUMENTS 3,900,822 A 8/1975 Hardwick et al.
4,290,039 A 9/1981 Tochizawa
4,509,716 A 4/1985 Barber et al.
4,518,938 A 5/1985 Bartholomaus et al.
4,575,008 A 3/1986 Kaczynski
4,832,314 A 5/1989 Trott
5,447,288 A 9/1995 Keuerleber et al.
5,752,689 A 5/1998 Barkhimer et al.
5,794,860 A * 8/1998 Neumann ................ 239/585.3
5,961,052 A 10/1999 Coldren et al.
6,005,763 A * 12/1999 North ......................... 361/154
6,035,979 A * 3/2000 Forster .................... 188/266.6
6,225,886 B1 5/2001 Kleinert et al.
6,279,843 B1 8/2001 Coldren et al.
6,494,389 B1 12/2002 Reiter
6,595,189 B2 7/2003 Coldren et al.
6,601,784 B2 * 8/2003 Muller-Girard et al. .. 239/585.1
6,827,331 B1 12/2004 Roos
6,854,703 B2 * 2/2005 Parker et al. ............ 251/30.01

(Continued)

*Primary Examiner*—Stephen K Cronin
*Assistant Examiner*—Johnny H Hoang
(74) *Attorney, Agent, or Firm*—Liell & McNeil; Carl E. Myers

(57) ABSTRACT

A self-guided armature assembly for a single pole solenoid assembly includes an armature stem and an armature. The solenoid assembly includes a flux ring component and an actuator body. The armature is movable inside the flux ring. An axial air gap is defined between the top armature surface of the armature and a bottom stator surface of a stator assembly. A sliding air gap is defined between an inner diameter surface of the flux ring and an outer diameter surface of the armature. The self-guided armature is guided along the flux ring via a guiding interaction between the armature and the flux ring. The sliding air gap is smaller than the axial air gap. A stem clearance gap is defined between the armature stem and the actuator body. The sliding air gap is also smaller than the stem clearance gap.

14 Claims, 3 Drawing Sheets

U.S. PATENT DOCUMENTS 7,013,876 B1 * 3/2006 Puckett et al. ............... 123/490
7,028,928 B2 * 4/2006 Shinogle .................. 239/585.1
7,349,192 B2 * 3/2008 Santero et al. .............. 361/139
7,464,912 B2 * 12/2008 Ricco et al. ............ 251/129.16
7,552,719 B2 * 6/2009 Joshi et al. .................. 123/490
2001/0023930 A1 9/2001 Kobayashi et al.
2002/0134958 A1 9/2002 Migliori
2004/0036048 A1 2/2004 Peterson
2008/0087254 A1 * 4/2008 Tanaka ....................... 123/472

* cited by examiner

SELF-GUIDED ARMATURE IN SINGLE POLE SOLENOID ACTUATOR ASSEMBLY AND FUEL INJECTOR USING SAME

TECHNICAL FIELD

The present disclosure generally relates to single pole solenoid actuator assemblies, and particularly to a self guiding armature strategy in a single pole solenoid actuator assembly, and fuel injectors using the same.

BACKGROUND

Although the use of dual pole solenoids appears to dominate in most fuel injector solenoid applications, single pole solenoids still remain preferred in some applications. In most dual pole solenoid designs, an armature is spaced at an axial air gap distance away from a stator having a coil embedded therein. Dual pole solenoids are often identified by an armature diameter that is typically about the same or greater than the outer diameter of the coil winding of the stator assembly. When the coil is energized, magnetic flux is generated around the coil, and flux lines pass through the stator, to the armature and back to the stator. The resulting flux path produces a pair of magnetic north and south poles between the stator and armature on each side of the air gap. The flux between these poles is generally parallel to the armature motion. These opposite poles produce a force on the armature that tend to move it in the direction of the stator and coil to accomplish some task, such as to open or close a valve, etc. In the case of all solenoids, a magnetic flux path is created around the coil.

In a typical single pole solenoid, the magnetic flux path also encircles the coil and passes through the stator, the armature, and back to the stator. The resulting flux path also produces a pair of magnetic north and south between the stator and the armature. In the single pole configuration, the flux between the poles is parallel to armature motion for one set of poles and perpendicular to armature motion for the other set of poles. Only one set of poles is producing magnetic force for armature motion. In both single and dual pole designs, the armature generally moves toward the stator to reduce the size of the air gap their between.

In many single pole solenoid designs, the armature must also have a radial sliding gap with respect to another electro magnetic component that is present to complete the magnetic circuitry. Single pole solenoids are often identified by an armature diameter that is smaller than the inner diameter of the coil winding of the stator assembly. Due primarily to manufacturing considerations, this extra magnetic piece is often not included as a portion of the stator, but is generally in contact with the stator, stationary and positioned to complete the magnetic circuit of the solenoid. Depending upon the configuration of the single pole solenoid, this additional magnetic component is sometimes referred to as a magnetic flux ring. When the coil is energized, the magnetic flux lines encircle the coil and pass sequentially through the stator, the magnetic flux ring, the armature, and back to the stator, or vice versa. Since the magnetic flux ring is stationary but the armature moves, there must be a sliding air gap between these two components. However, those skilled in the art will appreciate that this sliding gap is preferably as small as possible in order to produce the highest possible forces on the armature. When this sliding air gap becomes so small that the armature touches the magnetic flux ring, a high magnetic force is produced but the armature may be unable to move. When the sliding gap becomes too large, the magnetic flux can sometimes tend to seek out a lower reluctance path than spanning the sliding gap such that the solenoid can begin to perform poorly.

Typically, the armature may be guided by an armature guide piece, which is guided via an interaction with a guide bore. Those skilled in the art may recognize parallelism issues that may be related to guiding an armature guide piece via a guide bore. For instance, the guide piece might be a valve member that is attached to the armature, causing the sliding air gap geometry of the solenoid assembly to be dictated by the guiding interaction of the valve member, which is not really a part of the solenoid assembly. One potential problem with these configurations includes misaligning the armature guide relative to the guide bore, thereby causing the armature guide piece to contact the guide bore on one side, adversely affecting the movement of the armature guide piece inside a single pole solenoid assembly. The misalignment may further result in the armature leaning towards one side thereby contacting the flux ring component on one side while moving a distance away from the other side, potentially causing scuffing and an asymmetry in the magnetic flux, hence adversely affecting performance. Furthermore, excessive contact between the armature and the flux ring component may damage the armature, which is also undesirable.

The prior art teaches the use of a flux ring component to reduce the size of the sliding radial air gap to increase solenoid force. Co-owned U.S. Pat. No. 6,279,843 to Coldren et al. appreciates the importance of maintaining small axial and sliding radial air gaps, but fails to address the issues stemming from an armature guide piece guiding the armature via an interaction with a guide bore. Although the '843 patent teaches reducing misalignment by concentrically coupling the centerlines of the armature and the magnetic flux ring component, it still can suffer misalignment and performance problems due to geometric tolerance stack ups that must inherently be part of a multi-component assembly.

The present disclosure is directed toward at least one of the problems set forth above.

SUMMARY

In one aspect, a fuel injector includes an injector body that defines a nozzle outlet, and includes a valve assembly and a single pole solenoid actuator assembly. The valve assembly includes a valve seat, a valve member that is movable inside a valve bore. The valve member has an armature stem contact surface and a valve seat contact surface. The single pole solenoid actuator assembly includes a stator assembly, which includes a bottom stop component, and a flux ring component that has a flux inner diameter surface that defines a flux bore. An armature assembly includes a relatively soft armature attached to a relatively hard stem. The armature is movable inside the flux bore of the flux ring component between a first armature position and a second armature position. The armature includes a top armature surface and an armature outer diameter surface. The stem includes a first end that defines a hard stop surface and a second end that defines a valve contact surface. The hard stop surface of the stem is in contact with the bottom stop surface of the stator assembly when the armature is in the first armature position. The valve seat contact surface of the valve member is in contact with the valve seat, and the armature stem contact surface of the valve member is in contact with the valve contact surface of the stem, when the armature is in the second armature position.

In another aspect, a method of operating a fuel injector includes generating a magnetic flux circuit across a sliding air gap that is defined between a flux ring component and an armature that is a part of an armature assembly, which includes the armature attached to a stem. An axial air gap is defined between a stator assembly and the armature. Increasing pressure in a needle control chamber is accomplished by blocking a fluid connection between a needle control chamber and a low pressure drain by moving a valve member into contact with a valve seat. The pressure increasing step includes moving a stem from a first armature position to a second armature position, by de-energizing the single-pole solenoid. Relieving pressure in the needle control chamber is accomplished by opening the fluid connection between the needle control chamber and the low-pressure drain by moving the valve member out of contact with the valve seat. The pressure relieving step includes moving the stem from the second armature position to the first armature position by energizing the single-pole solenoid. Movement of the valve member is guided independently from guiding a movement of the stem.

In yet another aspect, a single-pole solenoid actuator assembly includes an actuator body, a stator assembly, a flux ring component and an actuator inner diameter surface that defines a actuator bore. The stator assembly includes a bottom stop surface. The flux ring component has a flux inner diameter surface. An armature assembly includes a relatively soft armature attached to a relatively hard stem. The stem includes a stem outer diameter surface, and the stem is movable inside the actuator bore. The armature includes a top armature surface and an armature outer diameter surface. A sliding air gap is defined between the armature outer diameter surface of the armature and the inner wall surface of the flux ring component. A stem clearance gap is defined between the stem outer diameter surface of the stem and the actuator inner diameter surface of the actuator body. The sliding air gap is smaller than the stem clearance gap.

DETAILED DESCRIPTION

The present disclosure relates to a self-guided armature of a single pole solenoid assembly. The single pole solenoid assembly has a sliding air gap that may be smaller than its axial air gap. When the solenoid assembly is a part of an actuator assembly, the armature may have a guiding interaction independent of a guiding interaction between a valve member and a valve bore.

Figure 1:
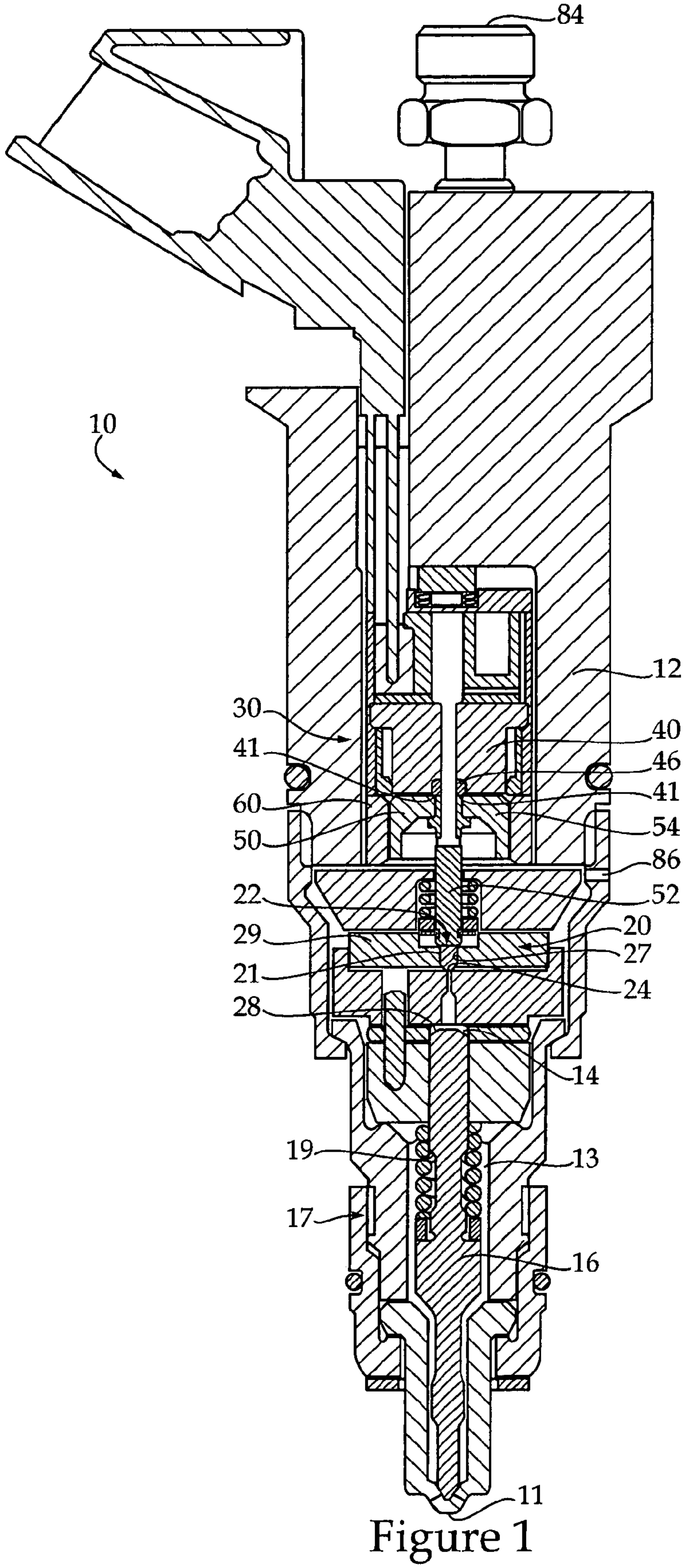
FIG. 1 is a sectioned side diagrammatic view of a fuel injector according to the present disclosure.

Referring to FIG. 1, a fuel injector 10 includes an injector body 12 that defines a nozzle outlet 11. Fuel injector 10 also includes a nozzle assembly 17 that includes a needle check valve 16 that has a opening hydraulic surface 19 exposed to fluid pressure inside a nozzle chamber 13. The needle check valve 16 is movable between an open position and a closed position. The needle check valve 16 also includes a closing hydraulic surface 28 exposed to fluid pressure inside a needle control chamber 14. The fuel injector 10 further includes a valve assembly 20 and a single pole solenoid actuator assembly 30. The valve assembly 20 includes a valve body 29, which is a part of the injector body 12, and a valve seat 24. A valve member 21, which is disposed inside the valve body 29, includes an armature stem contact global change and a valve seat contact surface 25. The valve member 21 is movably guided by an interaction with a valve bore 27 defined by the valve body 29. The single pole solenoid actuator assembly 30 includes a stator assembly 40 that may include a bottom stop component 46. The single pole solenoid actuator assembly 30 also includes a flux ring component 60 and an armature assembly 50, which includes an armature 54 attached to a stem 52. The fuel injector 10 further includes a cooling fuel inlet port 84 fluidly connected to a cooling line (not shown) that routes cooling fluid through and/or around solenoid actuator assembly 30. A drain passage 86 may be fluidly connected or fluid blocked from the needle control chamber 14 depending upon the position of the armature assembly 50 and the valve member 21 relative to the valve seat 24. Drain passage 86 also serves to route cooling fluid back to tank (not shown) for recirculation.

Figure 2:
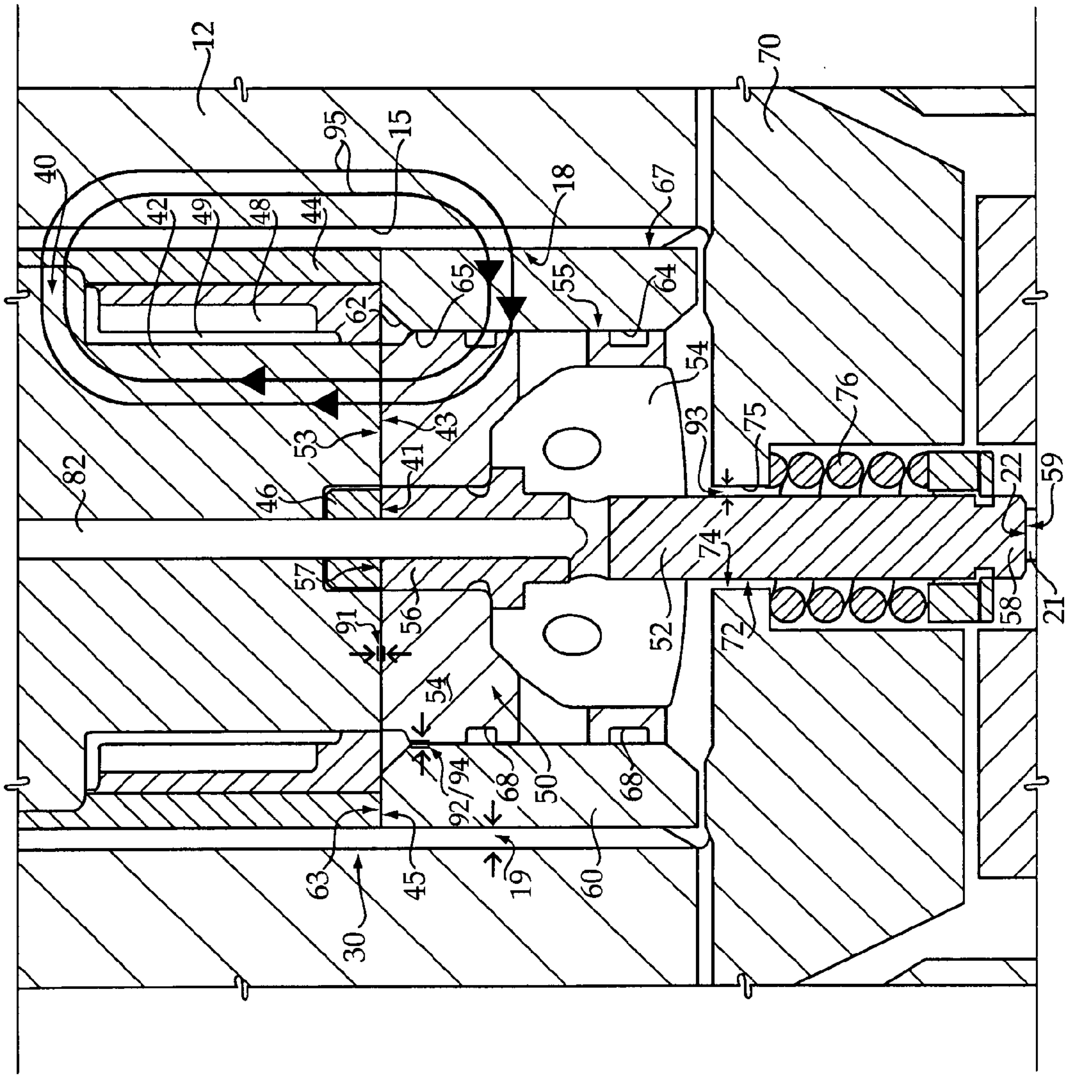
FIG. 2 is a sectioned side diagrammatic view of the single pole solenoid actuator assembly of the fuel injector shown in FIG. 1.
Figure 3:
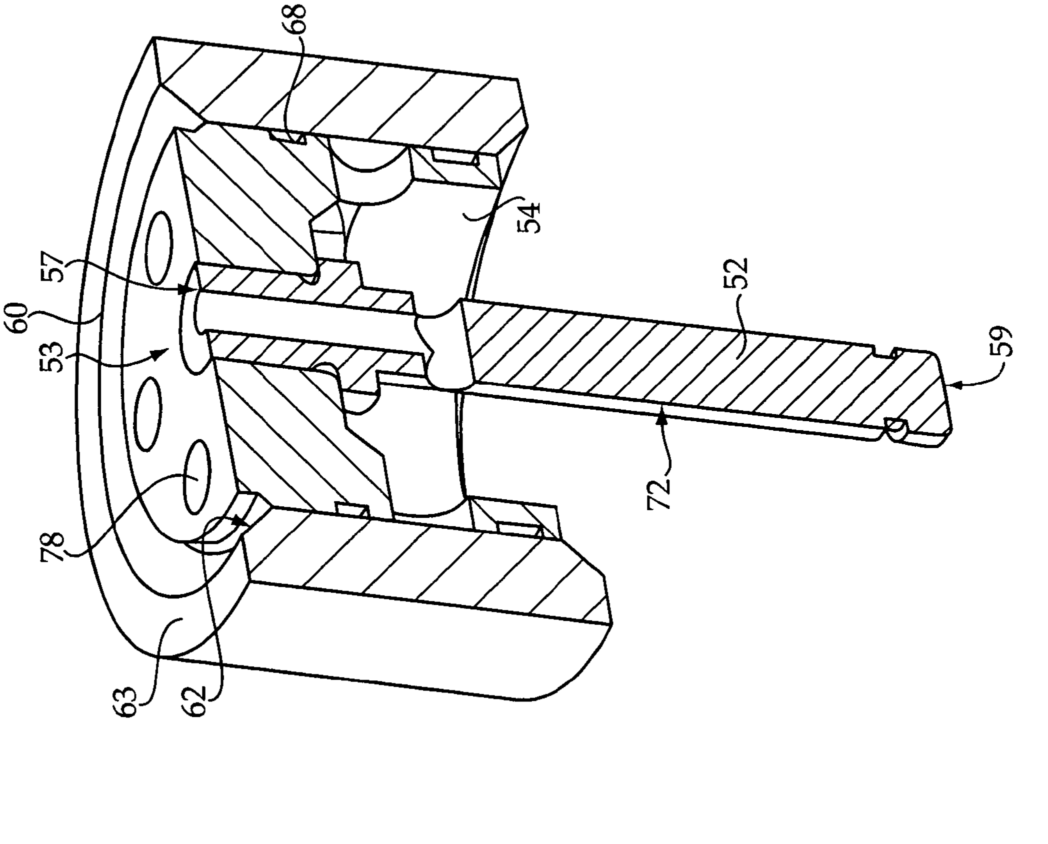
FIG. 3 is a sectioned perspective view of the armature assembly inside the flux ring component of the fuel injector shown in FIG. 1.

Referring now to FIG. 2 where, the single pole solenoid actuator assembly 30 of the fuel injector 10 is shown, and to FIG. 3 where the armature assembly 50 and flux ring component 60 are shown in greater detail. The solenoid actuator assembly 30 is disposed in an injector body bore 15 defined by the inner wall surface 18 of the injector body 12. The stator assembly 40 includes an inner pole 42 and an outer pole 44, both made from relatively soft magnetic material. The stator assembly 40 also includes a solenoid coil 48 wound around a bobbin 49, which is attached to the inner pole 42. A bottom stop component 46 may be attached to the stator assembly 40 or may be a part of the stator assembly 40. The bottom stop component 46 includes a bottom stop surface 41 that may be flush with the bottom stator surface 43 of the stator assembly 40. In order to withstand repeated impacts, bottom stop component 46 may be made from a relatively non-magnetic hard material known in the art. In an alternate embodiment, the stator assembly does not include a bottom stop component 46, but defines a bottom stop surface 41 along the bottom stator surface 43 of the stator assembly 40.

The single pole solenoid actuator assembly 30 also includes a flux ring component 60 positioned adjacent to an inner wall surface 18 of the injector body 12. The flux ring component 60 may be made from a relatively soft magnetic material that may have good magnetic properties. The flux ring component 60 includes a flux inner diameter surface 64 and a top flux surface 63 that is in contact with the bottom outer pole surface 45 of the outer pole 44. The flux inner diameter surface 64 defines a flux bore 65. The flux ring component 60 may also include chamfers 62 which may help reduce short circuiting of the magnetic flux path through a top corner of the flux ring component 60 to the inner pole 42, which could adversely affect performance.

The armature assembly 50 of the single pole solenoid actuator assembly 30 moves axially along the flux bore 65 between a first armature position and a second armature position. The armature 54 of the armature assembly 50 is responsive to the magnetic flux generated by the stator assembly 40 when the solenoid coil 48 is energized. The armature 54 of the armature assembly 50 includes a top armature surface 53 and an armature outer diameter surface 55. The top armature surface 53 of the armature 54 and the bottom stator surface 43 of the stator assembly 40 define an axial air gap 91. The armature outer diameter surface 55 and the flux inner diameter surface 64 of the flux ring component 60 define a radial sliding air gap 92.

The armature 54 is fixedly attached to the stem 52, which includes a first end 56 that defines a hard stop surface 57 and a second end 58 that defines a valve contact surface 59. The armature 54 may be made from a relatively soft magnetic material such that the armature 54 is more responsive to magnetic flux than a harder non-magnetic material. The stem 52 may be made from a material that is relatively harder than the material used for the armature 54, so that the stem 52 may be able to withstand repeated impacts with the bottom stop surface 41 of the stator assembly 40 and contact surface 22 of the valve member 21.

When the armature 54 is at the first armature position, the hard stop surface 57 of the stem 52 is in contact with the bottom stop surface 41 of the stator assembly 40. An axial air gap 91 is defined as a distance between the top surface 53 of the armature 54 and the bottom stator surface 43 of the stator assembly 40. When the armature 54 is in the first armature position, the axial air gap 91 is a final air gap. In one embodiment, the hard stop surface 57 of the stem 52 is precision ground such that the distance between the hard stop surface 57 and the top armature surface 53 of the armature 54 is the size of the desired final air gap. In the illustrated embodiment, one of the valve contact surface 59 of the stem 52 and the stem contact surface 22 of the valve member 21 has a flat surface, while the other has a convex surface. This may allow the contact between the two surfaces to be a point to surface contact, thereby reducing the sensitivity to misalignment of either the stem 52 or the valve member 21 with the other of the stem 52 and the valve member 21. In an alternate embodiment not shown, a valve assembly may include an upper valve seat, which may allow the valve member and the stem to lose contact when the armature is at the first armature position. By keeping the stem out of contact with, the valve body, any risk of misalignment caused by the valve body's interaction with the stem may be eliminated.

When the armature 54 is at the second armature position, the hard stop surface 57 of the stem 52 is out of contact with the bottom stop surface 41 of the stator assembly 40 and the axial air gap 91 is at an initial air gap. The valve contact surface 59 of the stem 52 is in contact with the stem contact surface 22 of the valve member 21 and the valve member 21 is seated at the valve seat 24. Those skilled in the art may appreciate keeping the initial and final air gap as small as possible may increase the magnetic flux between the armature 54 and the stator assembly 40, thereby improving the response time of the armature 54. In the present embodiment, the final axial air gap 91 may be around fifty microns.

The sliding air gap 92 may be smaller than the axial air gap 91. In the present embodiment, the sliding air gap 92 may be around 10 microns and the final axial air gap 91 may be around 50 microns. The small sliding air gap 92 allows the magnetic flux path 95 generated by the solenoid coil 48 to flow from the stator assembly 40, through the magnetic flux ring component 60, to the armature 54 and back to the stator assembly 40. In one embodiment, the magnetic flux path 95 may pass from the stator assembly 40 to the injector body 12 to the magnetic flux ring component 60. The magnetic flux path 95 may be uniform and continuous due to the small clearance gap 19 defined between the inner wall surface 18 of the injector body 12 and the flux outer diameter surface 67 of the flux ring component 60.

The solenoid actuator assembly 30 is disposed in the injector body 12. The outer pole 44 of the stator assembly 40 may be separated from the inner wall 18 of the injector body 12 by a clearance gap. The clearance gap may be small enough to allow the magnetic flux path 95 to flow from the outer pole 44 to the injector body 12.

In the present embodiment, at least one fluid hole 78 may be defined in the armature 54. The at least one fluid hole 78 extends from the top armature surface 53 of the armature 54 to the armature outer diameter surface 55 of the armature 54. Also, a cooling clearance 94 may extend along the sliding air gap 92, defined also by the armature outer diameter surface 55 of the armature 54 and the flux inner diameter surface 64 of the flux ring component 60. In one embodiment, the cooling clearance 94 is the same gap as the sliding air gap 92. Alternatively, cooling clearance may be defined by flats or grooves formed in one or both of the armature 54 and the flux ring component 60. The at least one fluid hole 78 may also reduce the mass of the armature, thereby increasing the armature's response to magnetic flux. Additionally, the armature 54 may also include at least one annular balance groove 68 along the armature outer diameter surface 55 of the armature 54. The balance groove 68 may encourage the armature 54 to remain centered inside the flux bore 65 while moving between the first and second armature positions, thereby reducing the risk of hindering the armature's movement through contact with the flux ring component 60.

The single pole solenoid actuator assembly 30 further includes an actuator body 70, which is part of the injector body 12, that includes an actuator inner diameter surface 74 defining an actuator bore 75. The stem 52 is movable inside the actuator bore 75 between the first armature position and the second armature position. A stem clearance gap 93 is defined between an outer stem surface 72 of the stem 52 and the actuator inner diameter surface 74 of the actuator 70. The stem 52 may be guided by the actuator bore 75 during the movement of the armature assembly 50 between the first and second armature positions. However, in the present embodiment, the stem clearance gap 93 may be larger than the sliding air gap 92 thereby the movement of the stem 52 is guided by the armature 54 being self guided along the flux ring component 60. Furthermore, the stem 52 may be biased towards the second armature position via a biasing spring 76.

Those skilled in the art will appreciate that in order to get better performance out of single pole solenoid actuator assembly 30, the sliding gap 92 may be as small as geometric tolerance stack ups will allow. However, those skilled in the art will also appreciate that inevitable geometrical tolerancing in the machining of the various components limits how small that sliding gap can be and still reliably produce large consistent quantities of the single pole solenoid assembly. Therefore, the present disclosure also teaches the use of guiding the armature independently of guiding the valve member or the stem in order to limit adverse performance that may arise due to tolerance stack ups of multiple components.

The stator assembly 40, the magnetic flux ring component 60, and armature 54 are preferably manufactured from a relatively soft magnetic material, which may be a suitable magnetically permeable material, such as silicon iron and/or magnetic material sold under the name SOMALOY. This is to be contrasted with the material out of which most of the remaining moving portions of the fuel injector and injector body are made, which may be made from relatively hard materials. For instance, the valve member 21, the stem 52 and the needle check valve 16 are preferably made from a material such as high carbon steel that has a relatively high hardness and high fatigue strength, but a relatively low magnetic permeability. It is believed that there are no known materials that exhibit satisfactory characteristics for use in both magnetic and impacting valving components within a fuel injector. In other words, metallic alloys with relatively high magnetic permeability are not generally suitable for use in valving components, which require a suitable combination of high hardness and high fatigue strength. In general, it is desirable that any of the components near and especially those in contact with the magnetic components have a relatively low magnetic permeability so that little to no magnetic leakage occurs. Thus, as used in this patent, the term magnetic material refers to a material having relatively high magnetic permeability but a relatively low combination of hardness and fatigue strength.

INDUSTRIAL APPLICABILITY

The present disclosure has particular applicability to single pole solenoid actuator assemblies, and a potential applicability to applications employing a self-guiding armature strategy in single pole solenoid actuator assemblies.

Referring to the figures, the fuel injector 10 includes the valve assembly 20 and the single pole solenoid actuator assembly 30. The fuel injector 10 may operate in a manner typical of most common rail fuel injectors. The present embodiment of the disclosure allows the solenoid actuator assembly 30 to be coupled to a valve assembly, but includes an armature assembly 50 that is not attached to the valve assembly 20. This allows guiding the movement of the armature assembly 50 and that of the valve member 21 to be independent, improving performance while relaxing sensitivities to geometrical tolerances associated with aligning the movement paths of the armature assembly 50 and the valve member 21. Further, the present embodiment allows the armature 54 to be guided by the flux ring component 60 without the guidance of the stem 52 via the actuator bore 75, thereby minimizing the risk of misalignment during motion of the armature assembly 50.

The present embodiment of the disclosure relates to a common rail single pole solenoid actuated fuel injector 10. Fuel enters the fuel injector 10 via a rail inlet port (not shown) and enters the nozzle chamber 13. Fuel in the nozzle chamber 13 exerts a fluid pressure on the opening hydraulic surface 19 of the needle check valve 16 while fuel in the needle control chamber 14 exerts fluid pressure on the closing hydraulic surface 28 of the needle check valve 16. Needle control chamber 14 is always fluidly connected to nozzle chamber 13 via a passage (not shown).

Prior to initiating an injection event, the solenoid coil 48 is de-energized, the armature assembly 50 is at the second armature position. When de-energized, the valve contact surface 59 of the stem 52 is in contact with the stem contact surface 22 of the valve member 21, and the valve member 21 is seated at the valve seat 24. When the valve member 21 is seated at the valve seat 24, the fluid connection between the needle control chamber 14 and the drain passage 86 is blocked, thereby increasing the pressure acting on the closing hydraulic surface 28 of the needle check valve 16. The pressure acting on the needle check valve 16 causes the needle check valve 16 to move to, or stay at, the closed position, preventing fuel from leaving the nozzle outlet 11.

To initiate an injection event, the solenoid coil 48 is energized. Upon energizing the solenoid coil 48, a magnetic flux circuit 95 is generated across the sliding air gap 92 and the axial air gap 91, causing the armature assembly 50 to move towards the first armature position. The armature assembly 50 is guided along the flux bore 65 thereby moving the stem 52 towards the first armature position. The stem 52 may or may not be guided by the actuator bore 75. In the illustrated embodiment, the sliding air gap 92 is smaller than the stem clearance gap 93, thereby moving the stem 52 without any guiding interaction or contact with the actuator bore 75. As the stem 52 moves towards the first armature position, the valve member 21 moves away from the valve seat 24. The valve member 21 is guided independently of the armature assembly 50, via the valve bore 27. As the valve seat 24 opens, a fluid connection between the needle control chamber 14 and the drain passage 86 is opened, and pressure inside the needle control chamber 14 is relieved. The force acting on the opening hydraulic surface 19 may move the needle check valve 16 towards the open position over the action of a spring 23 and the force exerted on the closing hydraulic surface 28. Fuel from the nozzle chamber 13 moves through the nozzle outlet 11. To end the injection event, the solenoid coil 48 is de-energized causing the armature assembly 50 to return to the second armature position, thereby seating the valve member 21 at the valve seat 24. The fluid connection between the needle control chamber 14 and the drain passage 86 is blocked and pressure inside the needle control chamber 14 begins to increase again, thereby moving the needle check valve 16 towards the closed position.

During the operation of the fuel injector 10, the solenoid coil 48 may generate heat that may adversely affect the operation of the fuel injector 10. The present embodiment includes a cooling inlet port 84 through which cooling fuel enters the fuel injector 10 and flows down a cooling line (not shown) through the stator assembly 40 into the at least one fluid hole 78 defined in the armature 54. The fluid hole 78 may allow the fuel to travel to the cooling clearance 94 between the armature outer diameter surface 55 and the flux inner diameter surface 64 thereby cooling the single pole solenoid actuator assembly 30 before the fuel is directed towards the drain passage 86 where it exits the fuel injector 10. Fuel passing through the cooling clearance 94 may also urge the armature 54 towards a centered position inside the flux ring component 60 by allowing the cooling fluid to exert fluid pressure along the armature outer diameter surface 55 of the armature 54. Those skilled in the art may appreciate that a fuel system may include a separate cooling fuel source such as from a fuel transfer pump (not shown).

The present disclosure teaches the use of a self guided armature that is guided independently of a valve member. By guiding the armature independent of the valve member, the risk of misaligning the armature during movement is reduced because misalignments in the movement of the valve member may not be transferred to misalignments in the movement of the armature assembly. Hence there may be an improved response time between the armature and the stator assembly. Furthermore, by reducing the size of the sliding air gap, the magnetic flux path is more uniform thereby further improving the accuracy of the armature's movement. By introducing cooling fuel, the single pole solenoid actuator assembly may reduce the operating temperature, which may also reduce the risk of adverse performance due to actuator assembly overheating.

It should be understood that the above description is intended for illustrative purposes only, and is not intended to limit the breadth of the present disclosure in any way. Thus, those skilled in the art will appreciate that various modifications might be made to the presently disclosed embodiments without departing from the full and fair scope of the present disclosure. Other aspects, features and advantages can be obtained from a study of the drawings, and the appended claims.

We claim:

1. A fuel injector, comprising:

an injector body defining a nozzle outlet and including a valve assembly and a single pole solenoid actuator assembly;

the valve assembly, including:

a valve seat;

a valve member being movable inside a valve bore and having an armature stem contact surface and a valve seat contact surface;

the single pole solenoid actuator assembly, including:

a stator assembly including a bottom stop surface;

a flux ring component having a flux inner diameter surface that defines a flux bore;

an armature assembly including a relatively soft armature attached to a relatively hard stem;

the armature movable inside the flux bore of the flux ring component between a first armature position and a second armature position:

the armature includes a top armature surface and an armature outer diameter surface;

the stem including a first end defining a hard stop surface and a second end defining a valve contact surface;

the hard stop surface of the stem being in contact with the bottom stop surface of the stator assembly when the armature is in the first armature position; and the valve seat contact surface of the valve member being in contact with the valve seat, and the armature stem contact surface of the valve member being in contact with the valve contact surface of the stem, when the armature is in the second armature position.

2. The fuel injector of claim 1 wherein the single pole solenoid actuator assembly further includes a sliding air gap and an axial air gap;

the sliding air gap being defined as a distance between the flux inner diameter surface of the flux ring component and the armature outer diameter surface of the armature;

the axial air gap being defined as a distance between the bottom stop component of the stator assembly and the top armature surface of the armature; and the sliding air gap being smaller than the axial air gap.

3. The fuel injector of claim 1 wherein:

the single pole solenoid actuator assembly includes an actuator body;

the actuator body having an actuator inner diameter surface defining a actuator bore;

the stem being movable inside the actuator bore; and the stem being out of contact with the actuator inner diameter surface of the actuator body.

4. The fuel injector of claim 1 wherein the armature includes at least one balance groove positioned on the armature outer diameter surface of the armature.

5. The fuel injector of claim 1 wherein the armature includes:

at least one fluid hole defined in the armature;

at least one cooling channel extending from the at least one fluid hole to the armature outer diameter surface of the armature.

6. The fuel injector of claim 1 wherein the sliding air gap includes a cooling clearance extending axially between the flux ring component and the outer diameter surface of the armature.

7. The fuel injector of claim 6 wherein the armature includes:

at least one fluid hole defined in the armature; and at least one cooling channel extending from the at least one fluid hole to the outer diameter surface of the armature.

8. A method of operating a fuel injector, comprising the steps of:

generating a magnetic flux circuit across a sliding air gap defined between a flux ring component and an armature that is a part of an armature assembly with the armature attached to a stem, and an axial air gap defined between a stator assembly and the armature, by energizing a single pole solenoid;

increasing pressure in a needle control chamber by blocking a fluid connection between a needle control chamber and a low pressure drain, including a step of moving a valve member into contact with a valve seat by moving a stem from a first armature position to a second armature position by de-energizing the single-pole solenoid;

relieving pressure in the needle control chamber by opening the fluid connection between the needle control chamber and the low pressure drain, including a step of moving the valve member out of contact with the valve seat by moving the stem from the second armature position to the first armature position by energizing the single-pole solenoid;

guiding a movement of the valve member independent from guiding a movement of the stem.

9. The method of operating a fuel injector of claim 8 further includes a step of biasing the stem into contact with the valve member via a biasing spring.

10. The method of operating a fuel injector of claim 8 wherein the step of guiding a movement of the valve member independent from guiding a movement of the stem includes guiding the movement of the stem via an interaction between the armature and the flux ring component.

11. The method of operating a fuel injector of claim 8 wherein the step of guiding a movement of the valve member independent from guiding a movement of the stem includes guiding the stem at least in part by guiding the movement of the stem via an interaction between the stem and a actuator bore.

12. The method of operating a fuel injector of claim 8 wherein the guiding step includes maintaining the stem out of contact with a valve body.

13. The method of operating a fuel injector of claim 8 wherein the guiding step includes the steps of:

introducing cooling fluid into a cooling clearance between an armature and a flux ring component;

urging the armature towards a centered position inside the flux ring component by moving cooling fluid inside the cooling clearance.

14. The method of operating a fuel injector of claim 8 wherein the step of moving the valve member out of contact with the valve seat includes a step of stopping the stem at the first armature position by moving the stem into contact with a bottom stop component of a stator assembly.

* * * * *